(12) United States Patent
Ersoy

(10) Patent No.: US 8,770,882 B2
(45) Date of Patent: Jul. 8, 2014

(54) BALL JOINT

(75) Inventor: Metin Ersoy, Walluf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 313 days.

(21) Appl. No.: 12/996,100

(22) PCT Filed: May 27, 2009

(86) PCT No.: PCT/DE2009/050029
§ 371 (c)(1),
(2), (4) Date: Dec. 3, 2010

(87) PCT Pub. No.: WO2009/146699
PCT Pub. Date: Dec. 10, 2009

(65) Prior Publication Data
US 2011/0081194 A1 Apr. 7, 2011

(30) Foreign Application Priority Data
Jun. 4, 2008 (DE) .......................... 10 2008 002 207

(51) Int. Cl.
*F16C 11/06* (2006.01)
(52) U.S. Cl.
USPC ........... 403/114; 403/116; 403/122; 403/129; 403/131; 403/166
(58) Field of Classification Search
USPC ........ 403/90, 109.6, 114, 115, 116, 122, 123, 403/128, 129, 131, 136, 138, 144, 146, 150, 403/152, 154, 161, 166, 306, 316, 319, 321, 403/322.1, 322.2, 324, 325, 327; 464/139, 464/141, 901
See application file for complete search history.

(56) References Cited

U.S. PATENT DOCUMENTS

| 2,687,024 | A |   | 11/1950 | George |
|---|---|---|---|---|
| 2,964,964 | A |   | 12/1960 | Craig |
| 3,068,032 | A | * | 12/1962 | Van Winsen ................. 403/78 |
| 3,107,505 | A | * | 10/1963 | Koss ............................ 464/141 |
| 3,656,184 | A | * | 4/1972 | Chambers ................ 623/22.15 |

(Continued)

FOREIGN PATENT DOCUMENTS

| DE | 42 24 895 A1 | 2/1994 |
|---|---|---|
| WO | 2005/051594 A2 | 6/2005 |

OTHER PUBLICATIONS

I.N. Bronstein and K.A. Semendjajew, Taschenbuch der Mathematik, 25 Auflange 1991, B. G. Teubner Verlagsgesellschaft, Stuttgart, Seite 605 I.N. Bronstein and K.A. Semendjajew, Handbook of Mathmatics, 25th Edition 1991, B.G. Teubner Publisher, Stuttgart, p. 605 (originally filed Dec. 3, 2010 with previous IDS).

*Primary Examiner* — Gregory Binda
*Assistant Examiner* — Nahid Amiri
(74) *Attorney, Agent, or Firm* — Davis & Bujold, PLLC; Michael J. Bujold

(57) ABSTRACT

A ball joint comprising a housing (4) having a pin opening (12), a ball pin (3) having a joint ball (2), the ball pin being movably supported in the housing (4) by the joint ball (2). The ball pin extends out through the pin opening (12) of the housing (4) and the joint ball (2) has a non-planar control surface (7) which is in contact with an abutment (8) provided on the housing (4).

20 Claims, 8 Drawing Sheets

(56) References Cited

U.S. PATENT DOCUMENTS

| | | | | |
|---|---|---|---|---|
| 3,908,709 A | * | 9/1975 | Moessinger | 139/450 |
| 3,949,675 A | * | 4/1976 | Luke | 102/236 |
| 3,958,904 A | * | 5/1976 | Rusbach | 403/90 |
| 4,034,582 A | * | 7/1977 | Oppolzer | 66/207 |
| 4,193,611 A | * | 3/1980 | Fisk | 280/416.1 |
| 4,916,966 A | * | 4/1990 | Weishaupt et al. | 74/473.29 |
| 4,921,271 A | | 5/1990 | Berry et al. | |
| 4,941,862 A | * | 7/1990 | Hazebrook et al. | 464/141 |
| 5,280,941 A | * | 1/1994 | Guhlin | 280/507 |
| 5,782,574 A | * | 7/1998 | Henkel | 403/135 |
| 5,860,669 A | * | 1/1999 | Wass et al. | 280/416.1 |
| 5,860,757 A | * | 1/1999 | Sugiura | 403/131 |
| 6,089,591 A | * | 7/2000 | Thomas | 280/511 |
| 6,142,034 A | * | 11/2000 | Rempinski | 74/473.22 |
| 6,145,181 A | * | 11/2000 | Murata et al. | 29/450 |
| 6,145,416 A | * | 11/2000 | Bonniot | 81/177.75 |
| 6,293,167 B1 | * | 9/2001 | Latz et al. | 74/493 |
| 6,488,436 B1 | * | 12/2002 | Modat | 403/135 |
| 2006/0228168 A1 | * | 10/2006 | Burnley | 403/122 |
| 2009/0038157 A1 | | 2/2009 | Kruse et al. | |

* cited by examiner

BALL JOINT

This application is a National Stage completion of PCT/DE2009/050029 filed May 27, 2009, which claims priority from German patent application Ser. No. 10 2008 002 207.1 filed Jun. 4, 2008.

FIELD OF THE INVENTION

The invention relates to a ball joint comprising a housing having a pin opening, and a ball pin having a joint ball, where the ball pin is movably supported in the housing by means of the joint ball and extends through the pin opening out of the housing.

BACKGROUND OF THE INVENTION

Frequently there is a need for a joint with which a tumbling motion is attainable, in particular, a spatial tumbling track with only one degree of freedom. For this purpose, a ball joint is suitable with its three degrees of freedom, two of which, however, must be cancelled in a targeted manner. To attain a tumbling motion, a ball joint can, for example, be used in whose joint ball surface two independent grooves are provided, in which two stationary guide pins or rollers engage that are supported at the joint housing. When movement occurs, these force the ball joint onto a predefined track so that it is possible to subject a part connected to the ball joint to a desired spatial movement.

The solution is, however, very costly because it is expensive to form the grooves by milling and if necessary grinding, and also to produce and assemble the guide finger. Furthermore, the double forced guidance requires high manufacturing tolerances.

SUMMARY OF THE INVENTION

Starting from this background, the object of the invention is to create a possibility for forced guidance of a ball pin of a ball joint that is cost-effective, particularly with respect to mass production.

The ball joint according to the invention, in particular for a vehicle, has a housing provided with a pin opening and a ball pin comprising a joint ball, where the ball pin is movable by means of the joint ball, especially in a rotational and pivotable manner, is supported in the housing, and extends through the pin opening and out of the housing, wherein the joint ball has a non-planar control surface which is in contact with an abutment provided at the housing.

Forced guidance of the ball pin is attained from the interaction of the control surface and the abutment causing a limitation to the freedom of movement of the ball pin. Preferably, the shape of the control surface defines a spatial trajectory along which the ball pin moves or can move when the ball pin rotates or is rotated about its longitudinal axis. By means of the shape of the control surface, a dependency is created, in particular between a rotation of the ball pin about its longitudinal axis and a lateral displacement of the ball pin about at least one other axis (pivot axis) that is aligned obliquely or perpendicularly to the longitudinal axis of the ball pin. Preferably, at least one pivot axis intersects the longitudinal axis of the ball joint, wherein the intersection point preferably lies in the center of the joint ball. The interaction of the control surface and the abutment forces especially the joint pin to laterally deflect while rotating about its longitudinal axis. The control surface is produced, for example, through cold pressing, which can be very cost-effective in large quantities. In particular, a control surface is mathematically understood to be a surface that can be created by movement of a line in space (see I. N. Bronstein and K. A. Semendjajew, Taschenbuch der Mathematik [Handbook of Mathmatics], $25^{th}$ edition 1991, B. G. Teubner Verlagsgesellschaft, Stuttgart, pg. 605).

A supplementary limitation of the freedom of movement of the ball pin, or supplementary forced guidance of the ball pin, can result through an additional guidance by means of which the ball pin is guided and in particular forced along a predefined trajectory. The additional guidance limits, in particular, the possible lateral deflections of the ball pin and can, for example, be formed by a slotted link through which the ball pin extends. The additional guidance is preferably formed by the pin opening. The additional guidance or pin opening is preferably oblong and in particular oval, which can be implemented relatively cost-effectively. The possible movements of the ball pin are preferably limited to a spatial trajectory, in particular for implementing a tumbling movement, by the pin opening and the interaction of the control surface and the abutment.

The ball pin preferably has a pin firmly connected to the joint ball, where the control surface, is for example, provided on the side of the joint ball facing away from the pin. In particular, the control surface forms a face surface or a face side of the ball pin opposite the pin. Preferably, the control surface is aligned approximately perpendicularly to the longitudinal axis of the ball pin, where the term "approximately" takes into account that the control surface is not planar. According to one embodiment, the joint ball has a flattening at approximately ⅔ of its height, at which the control surface is formed. Before the formation of the control surface, the flattening is preferably planar and aligned perpendicularly to the longitudinal axis of the ball pin. The control surface has, in particular, a circumferential boundary which preferably encompasses or surrounds the central longitudinal axis of the ball pin.

A protection bellows or bellows seal is preferably disposed between the housing and the ball pin, preventing the penetration of contaminants and moisture into the interior of the ball joint. The pin of the ball pin is formed in particular as a threaded pin.

The contact area between the control surface and the abutment is preferably linear and in particular lies on a straight line. Optimal guidance of the ball pin is thereby possible because, from the mathematical point of view, the control surface can be created by the movement of a straight line in space. The abutment is preferably solidly attached to the housing and/or supported thereon. According to a further development, the abutment is formed as a guide pin supported in the housing. The peripheral surface of the abutment is preferably in contact with the control surface along a straight line or a straight line of the peripheral surface. The abutment is preferably supported at the housing in a rotatable manner, so that friction can be reduced. The rotatable support can be provided, for example, by means of at least one needle bearing bushing. Furthermore, the abutment is supported at the housing, in particular, in a rotational manner about its longitudinal axis.

According to one embodiment, the ball joint has a locking mechanism by means of which the ball pin is locked, or can be locked, in end positions of its trajectory. In particular, the joint ball has a least one transverse bore for this purpose in which at least one detent ball is movably guided that engages or can engage in a latch recess provided in the housing. If the detent ball engages in the latch recess, the joint ball is locked at the housing. The detent ball is preferably pre-tensioned by means of a spring, in particular in the direction of the housing or latch recess, so that locking occurs automatically upon attaining the end position.

According to a further development, a longitudinal bore is provided in the ball pin and is preferably aligned obliquely or perpendicularly to the transverse bore, and an unlocking pin spring-mounted in the longitudinal bore presses or can press the detent ball into the latch recess. Due to the movement of the unlocking pin against the spring force, the pretension of the detent ball in the direction of the latch recess can be cancelled so that the joint ball is released, and the ball pin can be moved out of the end position.

The forced guidance of the ball pin is therefore not attained due to the grooves in the surface of the joint ball, but rather according to the invention due to a control surface that, in particular, is provided on the ball face surface opposite the pin. Preferably, the polar side of the ball is flattened at approximately ⅔ of the ball height, wherein the control surface is formed at this flattening. The control surface forces the ball pin to pivot laterally during its rotation. A guide pin can be used as an opposite side or abutment for the control surface, the guide pin being supported in the housing and contacting the ball joint with only one of the straight lines of its peripheral surface. In this manner, in particular pivoting of the joint ball perpendicular to the guide pin axis is prevented. In order to reduce friction, the guide pin can be supported in the housing using needle bearing bushings. Preferably, an oval housing opening performs a second or additional guidance of the ball pin.

According to a further development, the ball joint can be supplemented by a locking mechanism so that the ball pin can be stopped in the end positions of its tumbling trajectory. This is possible, for example, by means of transverse bores in the joint ball into which small detent balls are introduced which are pre-tensioned radially by a spring-loaded unlocking pin that is located in a longitudinal bore in the ball pin, which bore runs along the central line of the ball pin and, in particular, is aligned perpendicularly to the transverse bore. When the center of the detent ball is located between the surface of the joint ball and the housing inner surface, the ball pin is locked. To unlock the ball pin, the unlocking pin can be moved counter to the spring force into a releasing position, for example, by means of a button, a Bowden cable, an electric motor, a hydraulic cylinder, and/or a pneumatic cylinder.

The invention further relates to the use of a ball joint according to the invention for performing a movement, in particular a tumbling movement, of a vehicle part relative to the vehicle body of a vehicle.

BRIEF DESCRIPTION OF THE DRAWINGS

The invention is described below using a preferred embodiment with reference to the drawings. They show.

DETAILED DESCRIPTION OF THE PREFERRED EMBODIMENTS

Figure 1:
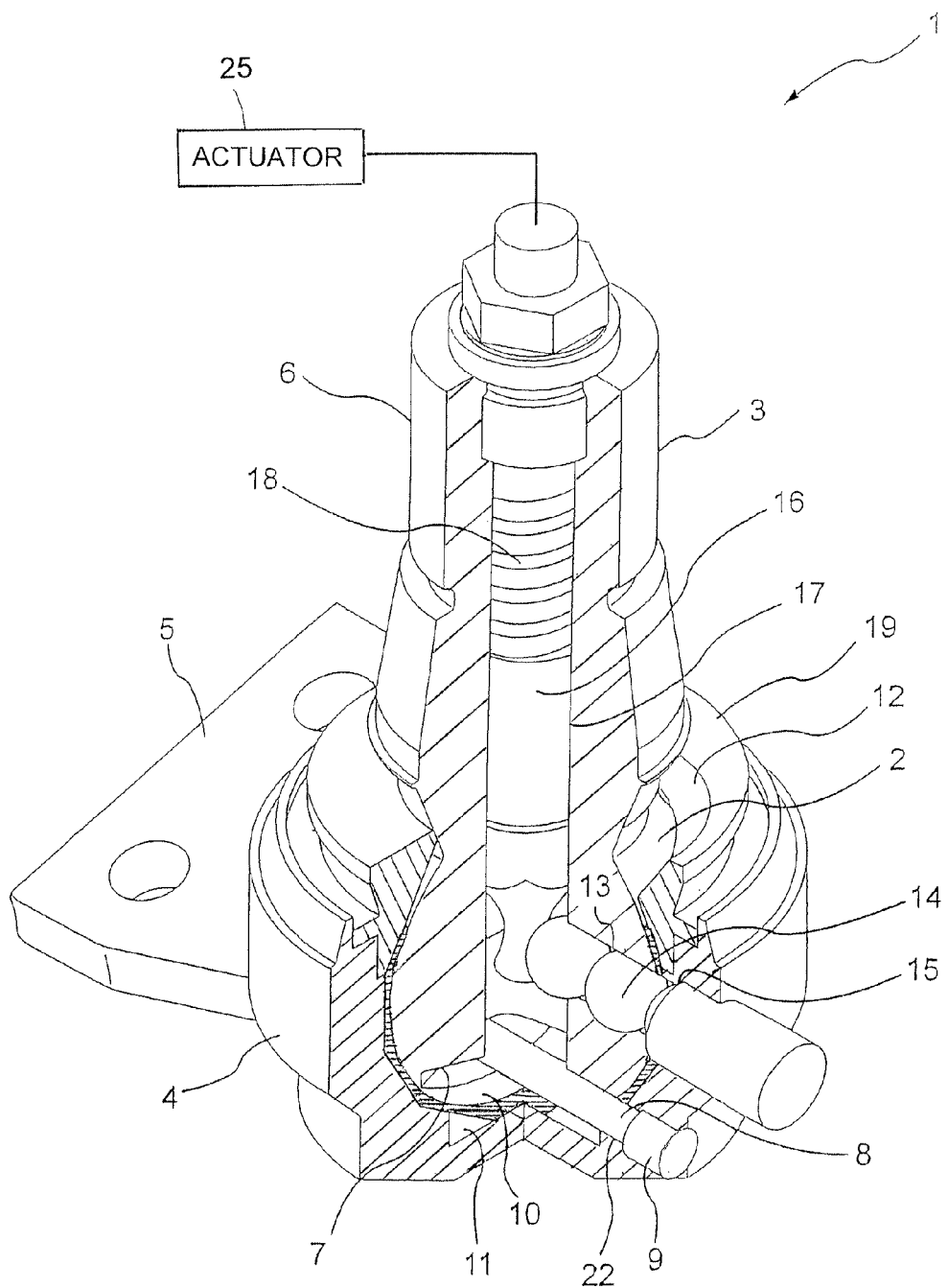
FIG. 1: a perspective, partial section of a ball joint according to one embodiment of the invention.

FIG. 1 shows a perspective view of a partial section of a ball joint 1 according to one embodiment of the invention, where a ball pin 3 provided with a joint ball 2 is supported in a rotational and pivotable manner with its joint ball 2 in a ball joint housing 4. The housing 4 can be fastened to a vehicle part by means of a flange 5 provided at the housing 4. Further, the ball pin can be fastened to a vehicle chassis so that the vehicle part can be moved relative to the chassis.

The ball pin 3 has a threaded pin 6 firmly connected to the joint ball 2 and extending out of the housing 4. A control surface 7, provided on the joint ball 2 on its side facing away from the pin 6, forms a face surface of the ball pin 3. The control surface is non-planar and abuts a forced guide pin (abutment) 8 which is enclosed in a bore 22 provided in the housing 4 and, by means of needle bearing bushings 9, is supported at the housing 4 and can rotate about its longitudinal axis. The ball pin 3 is supported in an internal space 11 of the housing 4 in the customary manner by interposing a ball shell 10; the internal space 11 is accessible via an oval shaped pin opening 12 through which the ball pin 3 extends. The housing 4 comprises a locking ring 19 in which the housing opening 12 is provided. The ball pin 3 is forcibly guided by the interaction of the control surface 7 and the guide pin 8, and by the oval housing opening 12, so that it can move, relative to the housing 4 only along a predefined trajectory that results in a tumbling motion of the ball pin.

The ball pin 3 can be locked in specific positions in the housing 4, for which a locking mechanism is provided that comprises several detent balls 14 disposed in the transverse bores 13 provided in the interior of the joint ball 2, that move along the transverse bores 13 and can engage in latch recesses 15 provided in the inner wall of the housing 4 bordering the internal space 11. The ball pin 3 is locked in the housing 4 when the detent balls 14 engage in the latch recesses 15. The detent balls 14 are pressed by means of an unlocking pin 16 radially outward in the direction of the latch recesses 15, wherein the unlocking pin 16 is slidably guided in an elongated bore 17 provided in the ball pin 3, and is pretensioned axially in the direction of the joint ball 2 by means of a spring 18. In the non-activated state, the unlocking pin 16 hence presses the detent ball 14 radially outward in the direction of the housing inner wall. To unlock the ball pin 3, the unlocking pin 16 can be moved, by means of an actuator 25, e.g. a button, a Bowden cable, an electric motor, a hydraulic cylinder, and/or a pneumatic cylinder (only diagrammatically illustrated in FIG. 1), against the force of the spring 18 axially away from the joint ball 2 so that the detent balls 14 can move along the transverse bores 13 into the interior of the ball pin 3, and thus can release the lock. The unlocked state can be seen in FIG. 1. At the location of the latch recesses 15, the ball shell 10 has holes through which the detent balls 14 can engage in the latch recesses 15.

Figure 2:
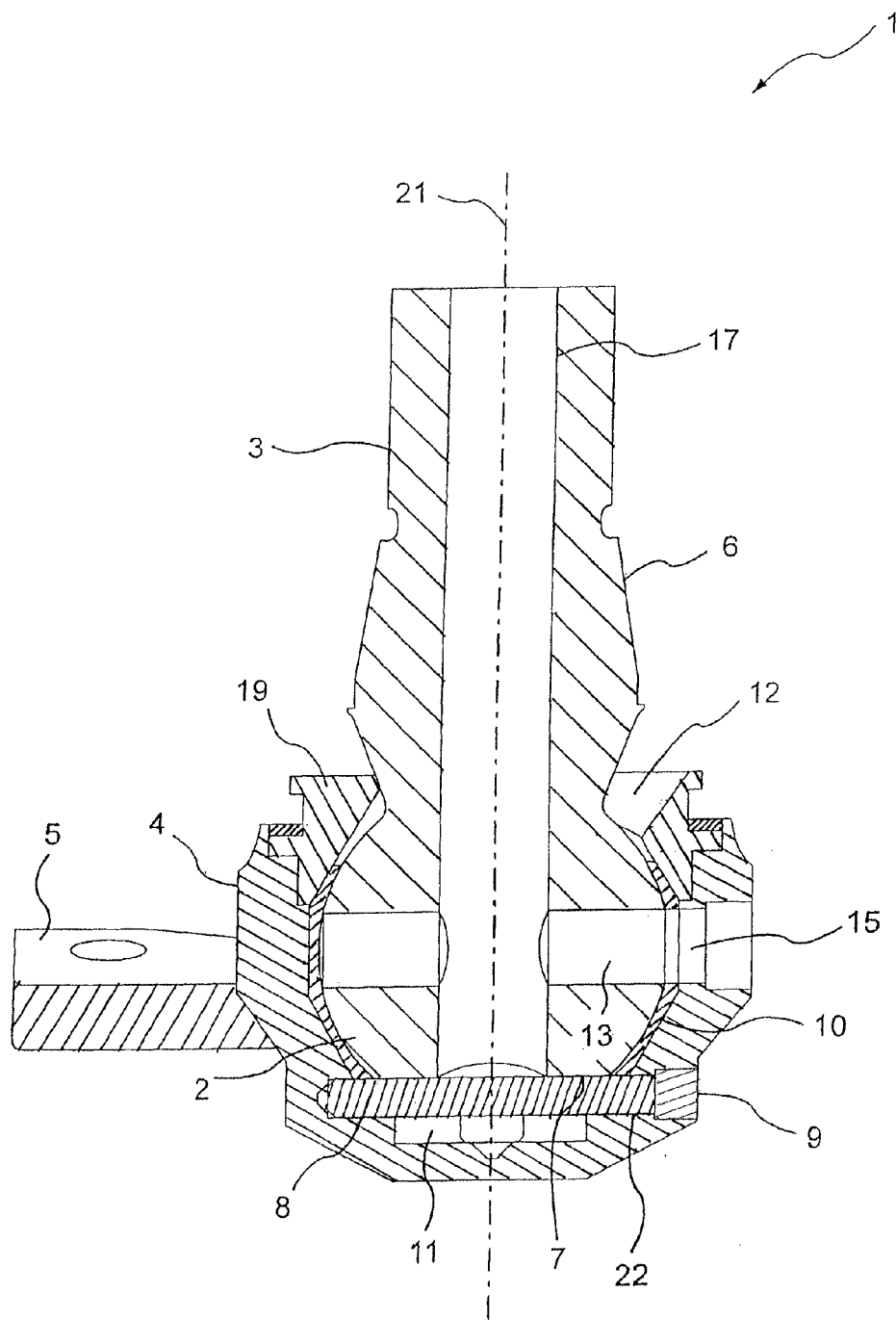
FIG. 2: a sectional view of the ball joint in a 0° position of the ball pin.
Figure 3:
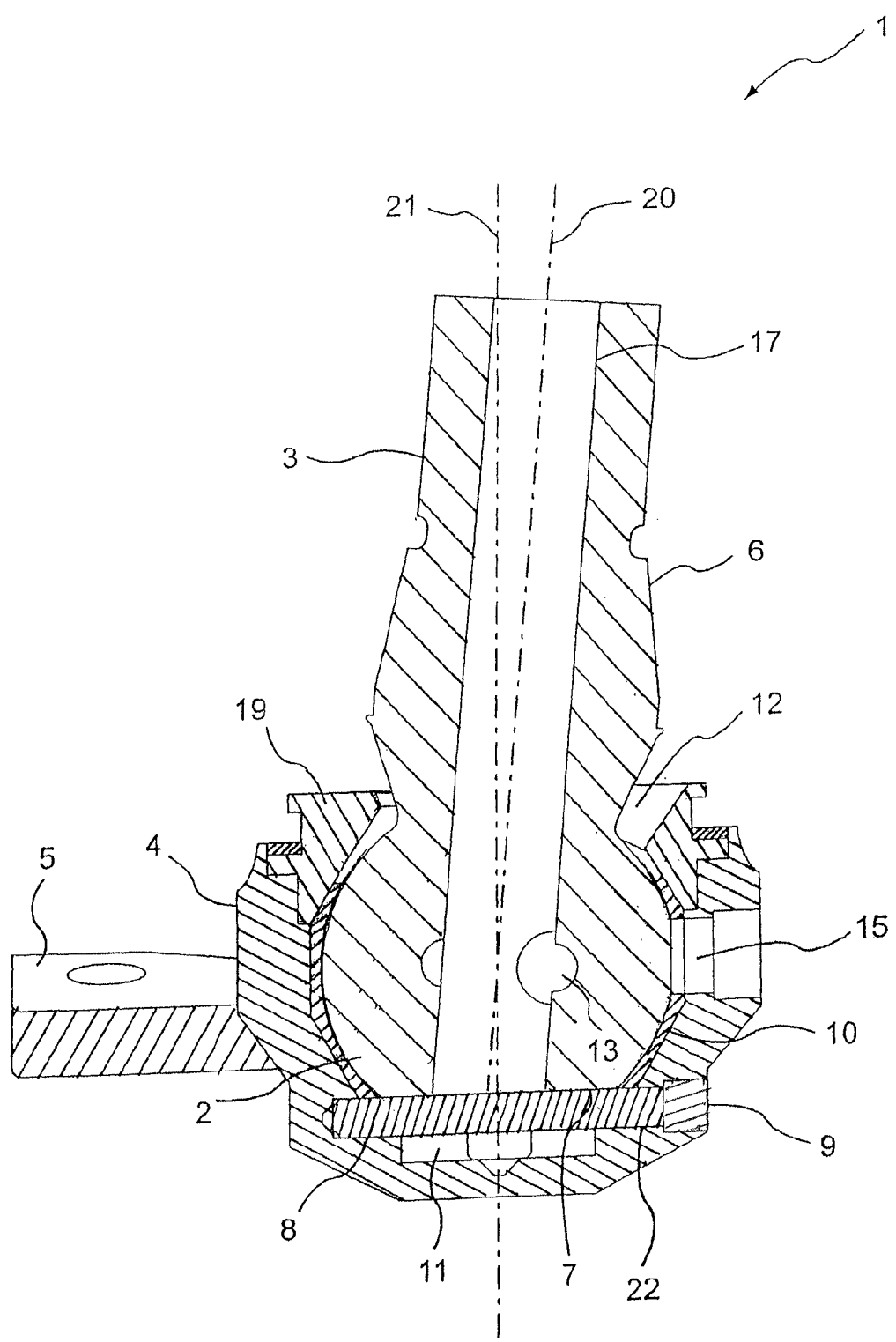
FIG. 3: a sectional view of the ball joint in a 30° position of the ball pin.
Figure 4:
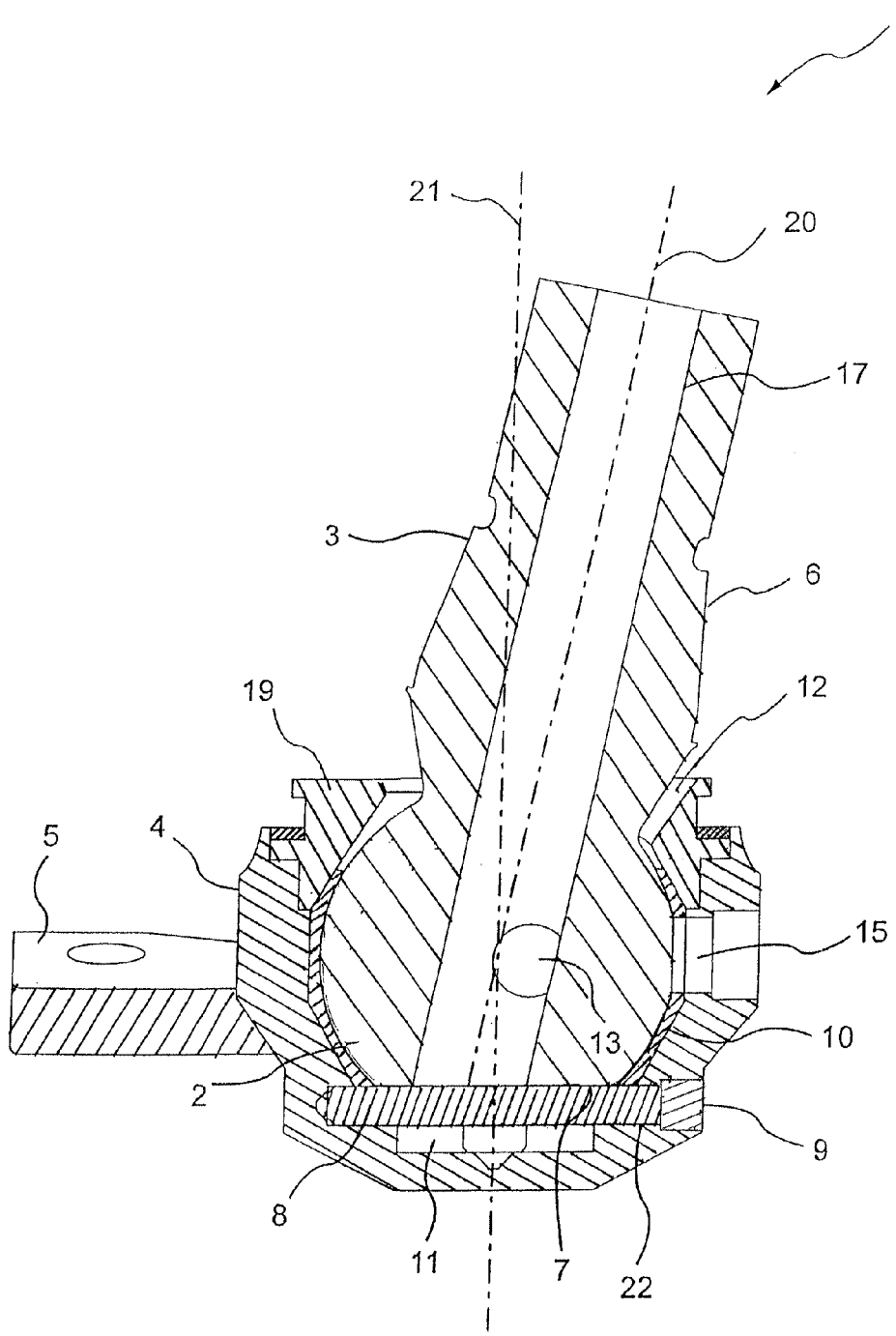
FIG. 4: a sectional view of the ball joint in a 60° position of the ball pin.
Figure 5:
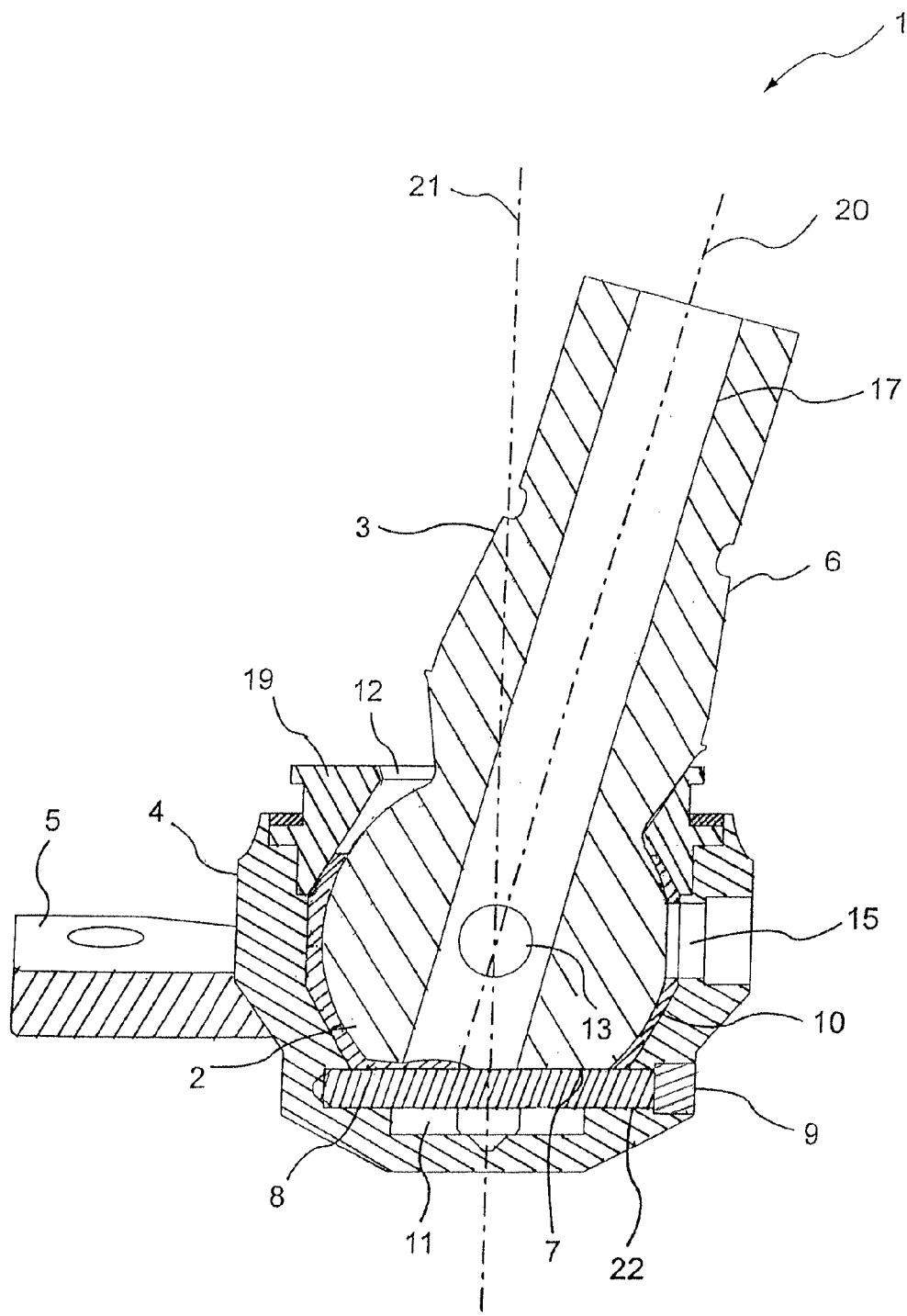
FIG. 5: a sectional view of the ball joint in a 90° position of the ball pin.
Figure 6:
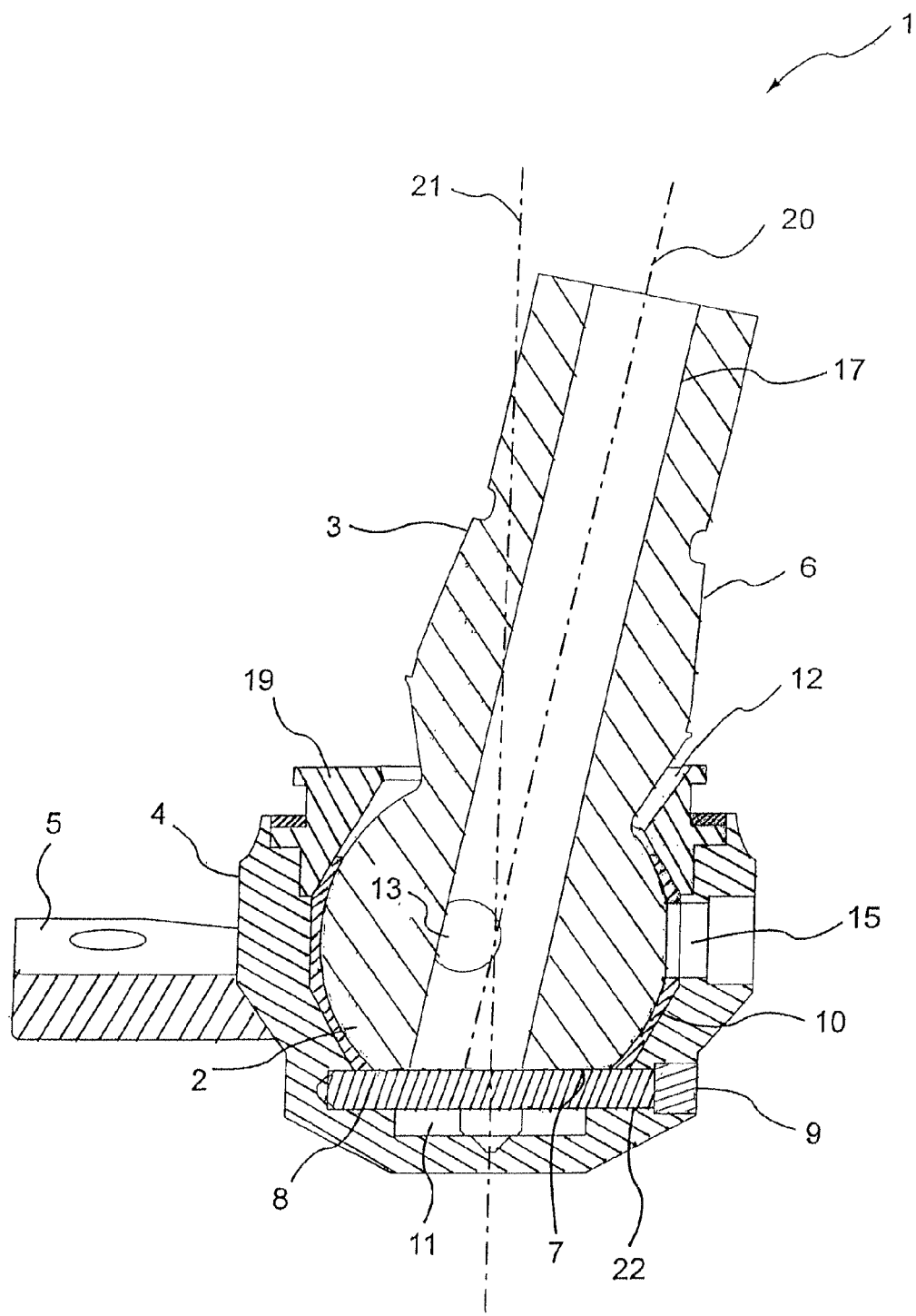
FIG. 6: a sectional view of the ball joint in a 120° position of the ball pin.
Figure 7:
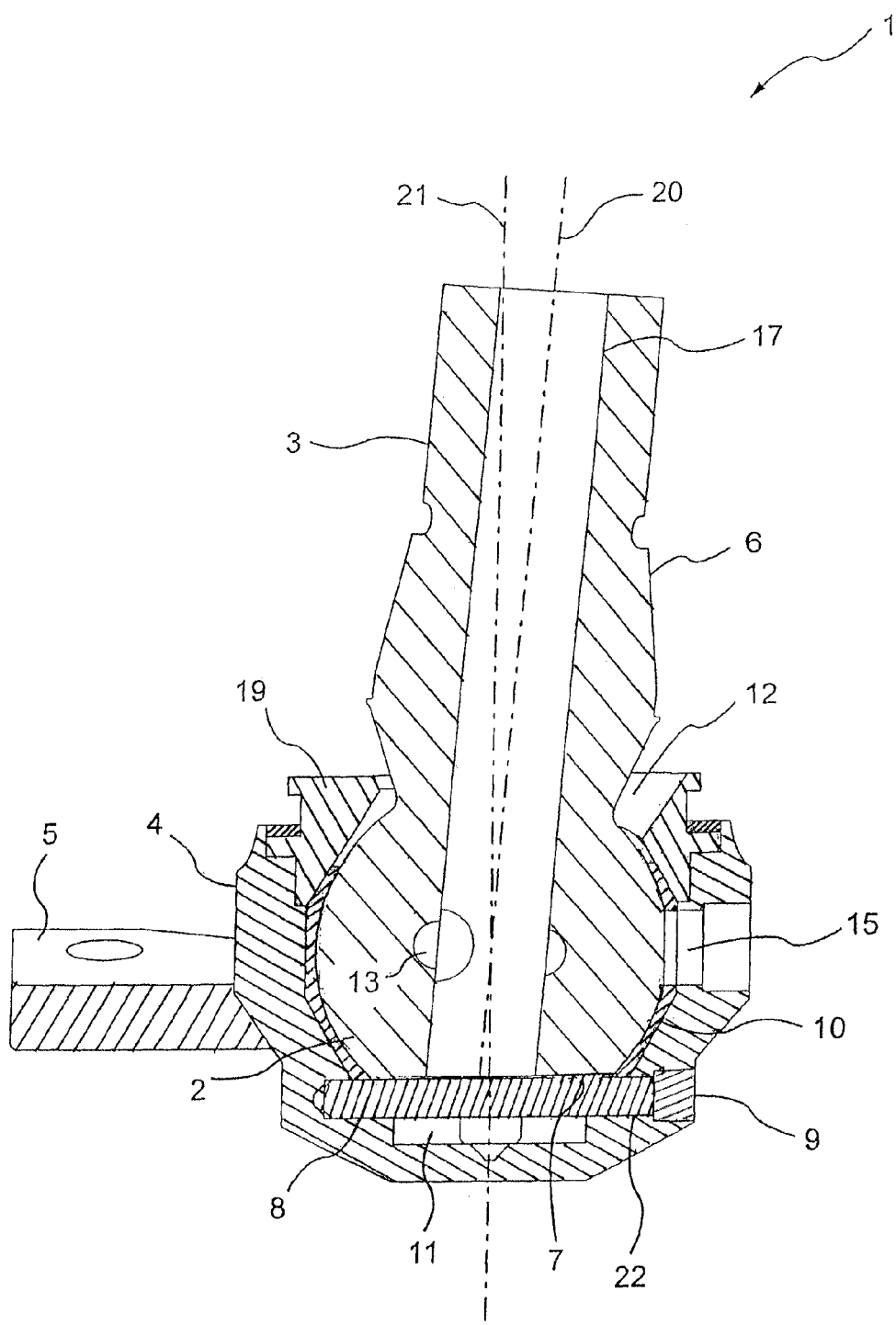
FIG. 7: a sectional view of the ball joint in a 150° position of the ball pin.
Figure 8:
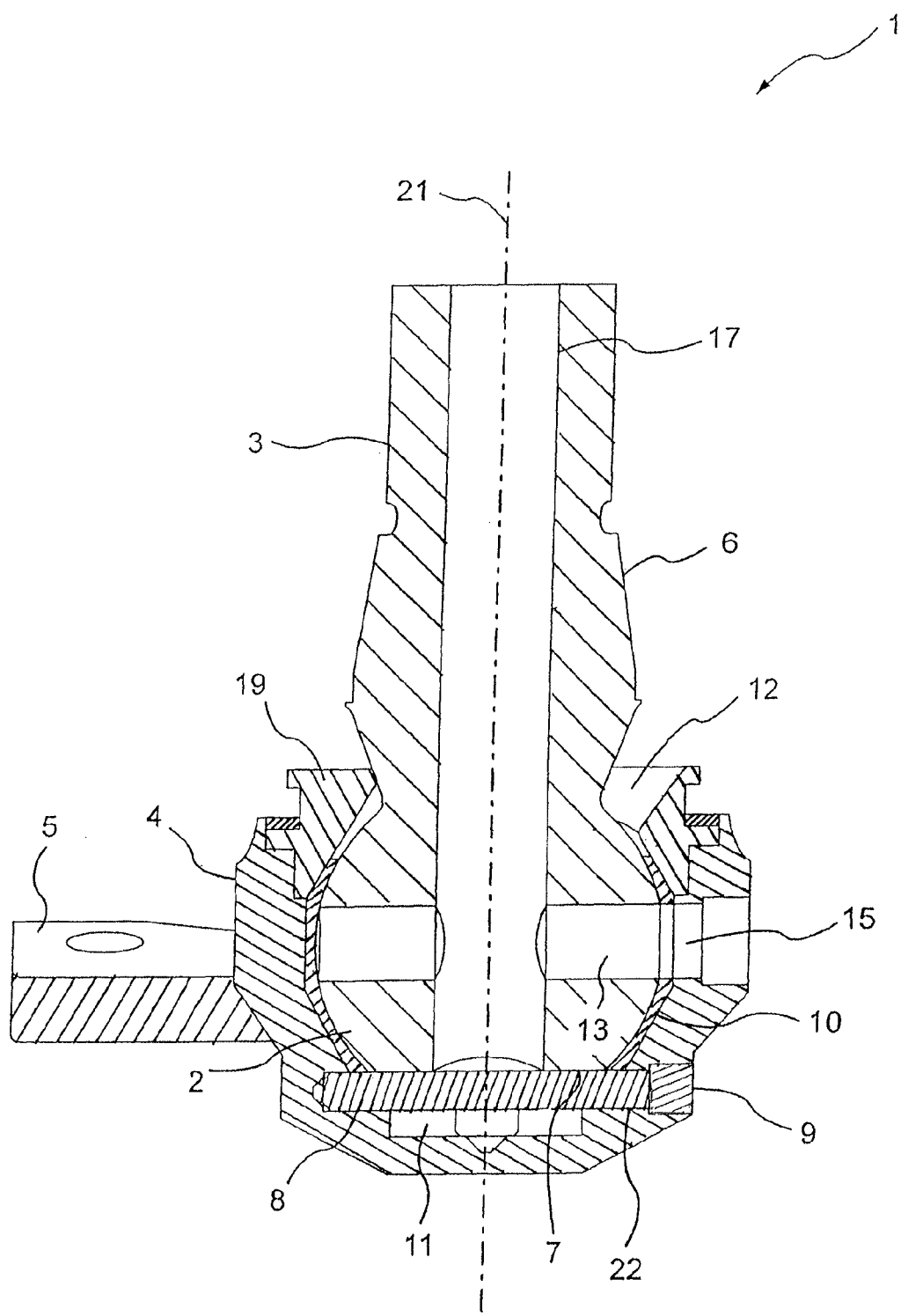
FIG. 8: a sectional view of the ball joint in a 180° position of the ball pin.

FIGS. 2 to 8 show sectional views of the ball joint 1, where for clarity the locking mechanism has been omitted. In FIGS. 2 to 8, the ball pin 3 is shown in different positions of its trajectory, where in FIG. 2 the ball pin 3 is rotated by an angle of 0° about its longitudinal axis 20 relative to the housing 4. In FIG. 2, the longitudinal axis 20 of the ball pin 3 nearly coincides with the longitudinal axis 21 of the housing 4 or joint 1, so that only the longitudinal axis 21 is represented. The corresponding applies for FIG. 8. The rotational angle by which the ball pin 3 is rotated about its longitudinal axis 20 is 30° in FIG. 3, 60° in FIG. 4, 90° in FIG. 5, 120° in FIG. 6, 150° in FIG. 7 and 180° in FIG. 8. Thus, according to FIGS. 2 to 8, the ball pin 3 rotates about its longitudinal axis 20 in steps of 30°. It can be seen here that the ball pin 3 in FIGS. 3 to 7 is deflected laterally, where the deflection is described by the angle between the two longitudinal axes 20 and 21. The dependency between the rotational angle and the deflection is fixed by the interaction of the control surface 7 and the guide pin 8, and by the guidance by the pin opening 12. The pin opening 12 determines the direction of deflection, whereas the interaction of the control surface 7 and the guide pin 8 assigns to each deflection a defined angle of rotation.

LIST OF REFERENCE CHARACTERS 1 ball joint
2 joint ball
3 ball pin
4 housing
5 flange
6 threaded pin
7 control surface
8 forced guidance pin
9 needle bearing bushing
10 ball shell/bearing shell
11 internal space
12 pin opening
13 transverse bore
14 detent ball
15 latch recess
16 unlocking pin
17 elongated bore
18 spring
19 locking ring
20 longitudinal axis of the ball pin/central longitudinal axis
21 longitudinal axis of the housing
22 housing bore

The invention claimed is:

1. A ball joint comprising:
a housing (4) having a pin opening (12), and the housing defines a longitudinal axis,
a ball pin (3) having a joint ball (2), and the ball pin defines a longitudinal axis (20),
the ball pin being movably supported within the housing (4) by the joint ball (2) such that the ball pin is rotatable about the longitudinal axis of the ball pin with respect to the housing, and the ball pin extending out through the pin opening (12) of the housing (4), and
the joint ball (2) having a non-planar control surface (7) engaging with an abutment (8) provided on the housing (4) such that, as the joint ball (2) rotates relative to the housing (4), the engagement between the non-planar control surface (7) and the abutment (8) deflects the ball pin (3) laterally with respect to the longitudinal axis of the housing.

2. The ball joint according to claim 1, wherein the abutment is fixedly connected to the housing and the longitudinal axis of the housing passes through the abutment (8).

3. The ball joint according to claim 1, wherein a linear contact area is formed between the control surface (7) and the abutment (8), and lies on a straight line.

4. The ball joint according to claim 1, wherein the ball pin (3) has a pin (6) solidly fastened to the joint ball (2), and the control surface (7) of the ball pin is provided on a radially opposite side of the joint ball (2) from the pin (6).

5. The ball joint according to claim 1, wherein the control surface (7) lies approximately perpendicular to the longitudinal axis (20) of the ball pin (3).

6. The ball joint according to claim 1, wherein the joint ball (2) has, at approximately ⅔ of its height of a polar side of the joint ball along the longitudinal axis of the ball pin, at least one flattened area which forms a portion of the control surface (7).

7. The ball joint according to claim 1, wherein the control surface (7) is produced by cold pressing process, the ball pin (3) is laterally deflected between a first lateral position and a second lateral position depending on an angle of rotation of the ball pin about the longitudinal axis of the ball pin such that at a 0° and 180° angle of rotation of the ball pin, the ball pin is laterally deflected to the first lateral position in which the longitudinal axis of the ball pin is coaxial with the longitudinal axis of the housing, and at a 90° angle of rotation of the ball pin, the ball pin is laterally deflected to the second lateral position.

8. The ball joint according to claim 1, wherein the abutment (8) is a guide pin that is supported in the housing (4) on a longitudinally opposite side of the joint ball from a pin of the ball pin and the guide pin has a peripheral surface that contacts the control surface (7) along a straight line.

9. The ball joint according to claim 8, wherein the guide pin (8) is supported by the housing (4) and rotatable about a longitudinal axis of the guide pin.

10. The ball joint according to claim 8, wherein the guide pin (8) is supported rotatably by the housing (4) by at least one needle bearing bushing (9).

11. The ball joint according to claim 1, wherein a locking ring is fixed to the housing and defines the pin opening which limits lateral deflection of the ball pin (3), the pin opening being offset with respect to the longitudinal axis of the housing.

12. The ball joint according to claim 11, wherein the pin opening (12) is oval.

13. The ball joint according to claim 1, wherein a locking mechanism is lockable when the longitudinal axis of the ball pin is coaxially aligned with the longitudinal axis of the housing to lock rotation and lateral deflection of the ball pin (3) with respect to the housing.

14. The ball joint according to claim 13, wherein the locking pin communicates with and is movable by one of a button, a Bowden cable, a pneumatic, a hydraulic and an electric motor so as to unlock the ball pin.

15. The ball joint according to claim 1, wherein the joint ball (2) has a least one transverse bore (13) which is aligned with a latch recess in the housing when the longitudinal axes of the ball pin and the housing are coaxial, at least one detent ball (14) is movably guidable within the at least transverse bore to engage in the latch recess (15) provided in the housing (4) to lock the ball pin to the housing.

16. The ball joint according to claim 15, wherein a longitudinal bore (17) is provided in the ball pin and is aligned perpendicularly to the transverse bore (13), and a locking pin (16) is spring-mounted in the longitudinal bore which biases the at least one detent ball (14) into the latch recess (15) to lock movement of the ball pin with respect to the housing.

17. The ball joint according to claim 1, wherein the guide pin (8) extends normal to and is coincident with the longitudinal axis of the housing, and
the housing has at least one latch recess (15) for accommodating at least one detent ball (14), and the at least one latch recess (15) extends parallel to the guide pin (8).

18. A ball joint comprising:
a housing (4) having a locking ring (19) with an oval shaped pin opening (12), the housing defining a longitudinal axis,
a ball pin (3) having an integral joint ball (2) and defining a longitudinal axis (20), the ball pin being movably secured within the housing (4) by the locking ring (19) with the ball pin (3) extending out through the pin opening (12) of the housing (4),
the oval shape of the pin opening (12) limiting movability of the ball pin (3) and the joint ball (2), and
the joint ball (2) having a partially flattened control surface (7), opposite the ball pin (3), which engages with an abutment (8) provided on the housing (4) such that, as the joint ball (2) rotates relative to the housing (4), the engagement between the partially flattened control surface (7) and the abutment (8) deflects the ball pin (3) laterally with respect to the longitudinal axis of the housing.

19. A ball joint comprising:
a housing that defines a housing longitudinal axis, the housing having a pin opening;
an abutment is fixed to the housing at an axial side of the housing opposite the pin opening;
a ball pin having a joint ball, the ball pin defining a pin longitudinal axis that extends diametrically through the joint ball and the joint ball having a non-planar control surface that is located on a side of the joint ball that is diametrically opposite the ball pin;
an elongated bore (17) is formed within the ball pin (3) and an unlocking pin (16) being slidably guided within the elongated bore (17); and
the ball pin being movably supported in the housing by the joint ball such that the ball pin extends out of the housing through the pin opening, and the control surface of the joint ball contacts the abutment such that the ball pin is laterally deflected with respect to the housing longitudinal axis due to rotation of the ball pin about the pin longitudinal axis, and the ball pin being rotatable about the pip longitudinal axis at least 180 degrees in two opposed rotational directions.

20. The ball joint according to claim 19, wherein the abutment is fixed in the housing so as to be aligned normal to the housing longitudinal axis and so as to intersect the pin longitudinal axis and the control surface of the joint ball is normal to the housing longitudinal axis when the pin longitudinal axis is coaxial with the housing longitudinal axis.

* * * * *